Patented July 11, 1933

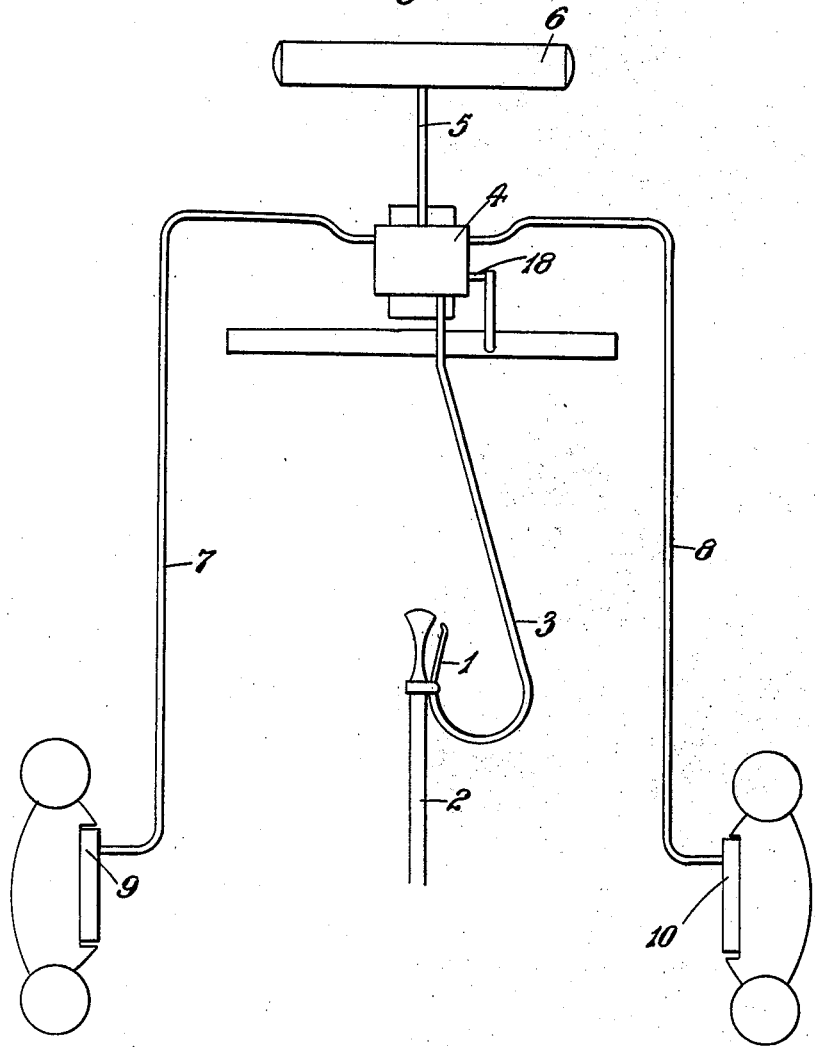

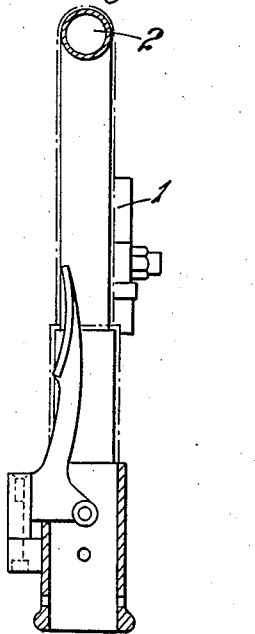
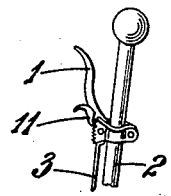
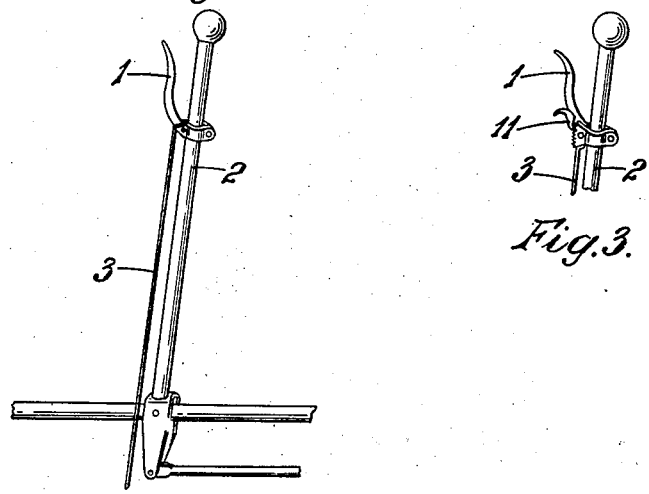
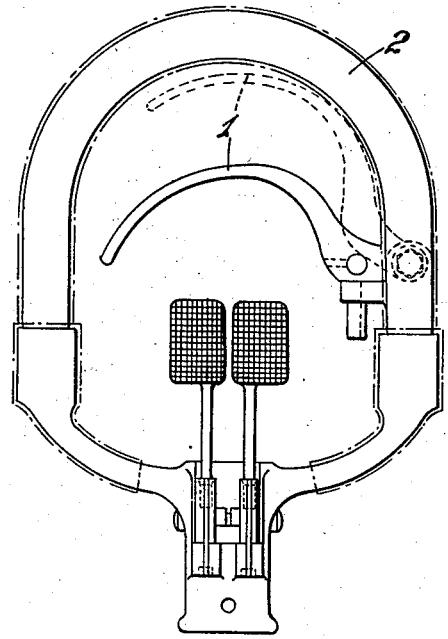

1,917,933

UNITED STATES PATENT OFFICE

ERNEST FREDERICK GOODYEAR, OF MOXHALL PARK, WISHAW, JOSEPH WRIGHT, OF STOKE PARK, COVENTRY, AND HENRY TREVASKIS, OF KERESLEY, COVENTRY, ENGLAND, ASSIGNORS TO DUNLOP RUBBER COMPANY LIMITED, OF LONDON, ENGLAND, A BRITISH COMPANY

AIRCRAFT WHEEL BRAKE SYSTEM

Application filed December 8, 1932, Serial No. 646,264, and in Great Britain December 2, 1931.

This invention concerns improvements in aeroplane controls and in particular concerns an improved system of brake control and operation for aircraft in which the brake control is power operated and remotely controlled.

The brake system to be described includes a form of remote control which is simple, sensitive and particularly adapted for aircraft purposes.

Proposals have previously been made to fire machine guns by controls affixed to the principal flying control or "joystick" and more recently following the adoption and more advanced development of brakes for aircraft there are numerous examples of brakes actuated by levers within the reach of the pilot's arm, including some in which the working pressure is set and maintained by the more or less continuous muscular efforts of the pilot.

In contradistinction to these proposals we provide a brake system controlled by means which enable delicate degrees of brake application and regulation to be effected with minimum effort and at a distance from the pressure exerting mechanism, thereby economizing space in the cockpit, and which at the same time reduce the manual effort to such an extent that the fingers alone may be used to apply the brakes, the power of application being only limited by the pressure of the fluid available and being independent of the pilot's strength.

Further advantages consist in wholly obviating the distraction and fatigue due to the necessity existing hitherto, of employing one hand on the flying control and the other on an adjacent brake control during the period of landing or while turning on the ground whereas by our invention one hand is freed for other important purposes.

Further advantage of the present system will be apparent from the manner of grouping the valves in a multiple unit, the number of operative connections from the principal control lever being thus reducable to one as is shown hereafter, and a plurality of lengthy cable connections to associated controls being rendered unnecessary.

The multiple relay unit though described in the present application more particularly forms the subject matter, of our application Ser. No. 640,760, filed November 2, 1932, the individual relay valves and improvements thereto forming the subject matter of British Patent Nos. 33371/31 and 20184/32.

According to this invention we provide aircraft brake control systems in which the release of brake energizing fluid under initial pressure is controlled independently of movement of the principal flying control by the movement of a finger lever attached to the principal flying control for simultaneous and independent relative displacement preferably in which the movement of the finger lever controls the pressure of the fluid admitted to the brakes by actuating pneumatic relays connected to a chamber containing fluid under pressure, the movement of the finger control causing an equalized variation in the pressure transmitted to the brakes and an associated control causing a differential pressure to be transmitted to the brakes by movement of a pedal which also deflects the rudder which may be fully deflected without application of the brakes until the brakes are differentially applied automatically by moving the finger lever after the rudder is deflected.

In order that the invention may be more easily understood and readily carried into effect, the invention will now be described with reference to the accompanying drawings, in which:—

Fig. 1 is a diagrammatic representation of the general arrangement.

Fig. 2 is a side elevation of one form of the brake control attached to the flying control.

Fig. 3 is a part side elevation of a modification in which a parking lock is added to the brake control shown in Fig. 2.

Fig. 4 is a similar view of a brake control associated with a spade grip flying control.

Fig. 5 is a part front elevation of the control shown in Fig. 4.

Figure 6:
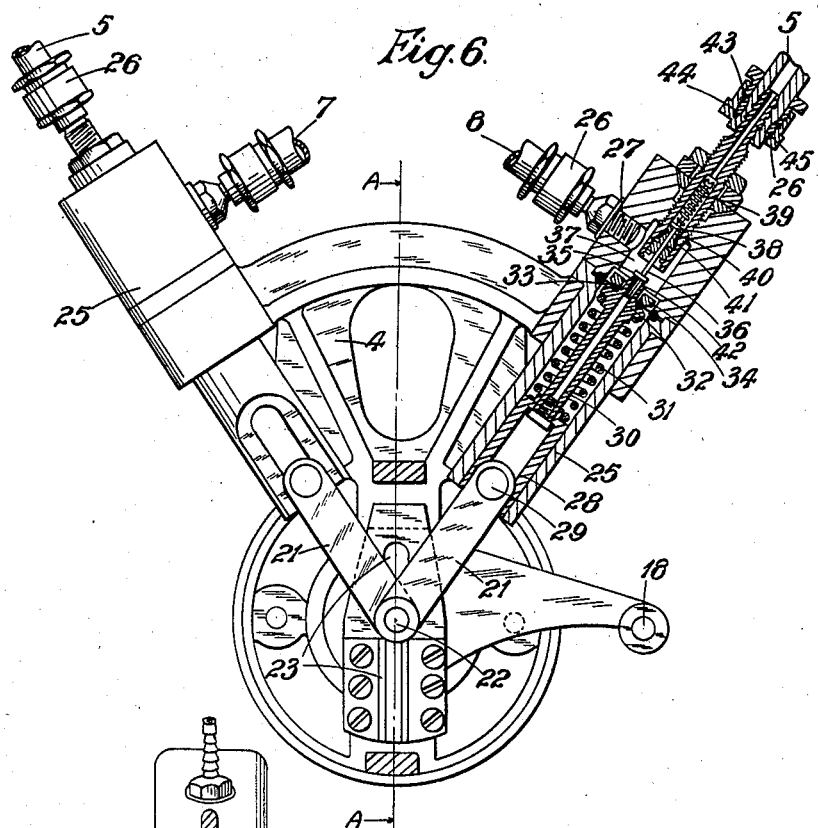
Fig. 6 is a part sectional plan view of the multi-relay device unit.

In the general arrangement diagrammatically shown in Fig. 1 the brake control lever 1 is attached to the principal flying control 2 and is connected by a cable or other system of links 3 to a relay valve unit 4.

The fluid relay unit 4 is supplied with compressed air through a pipe or pipes 5 from one or more air containers 6 and the multi-relay unit 4 is also connected by pipe lines 7 and 8 to the distensible chambers in the brake gear contained by the wheels 9 and 10.

The brake control may be combined with the flying control as shown in Figs. 2 and 3 in the former of which the brake lever 1 is pivotally attached adjacent its base to the control lever 2, and may in addition be provided with a ratchet lever 11 so as to maintain the displacement of the lever 1 from the normal position and so maintain an application of the brakes for parking purposes.

The lever 1 is displaceable with and independently of the principle flying control in relation thereto by a contraction of the fingers of the same hand of the pilot with which he moves the flying control.

The lever 11 may also be operated in the same manner if desired, thereby maintaining a constant brake pressure to keep the areoplane stationary upon sloping ground or to prevent its being moved by wind or other forces.

As the brake system herein described permits of a remote disposition of the brake actuating gear in an accessible place remote from the cockpit wherein space is thereby economized, the connection 3 from the brake control 1 is made by means of a bowden cable 3 in preference, or by other suitable linkages, the force to be transmitted being comparatively slight.

Figure 7:
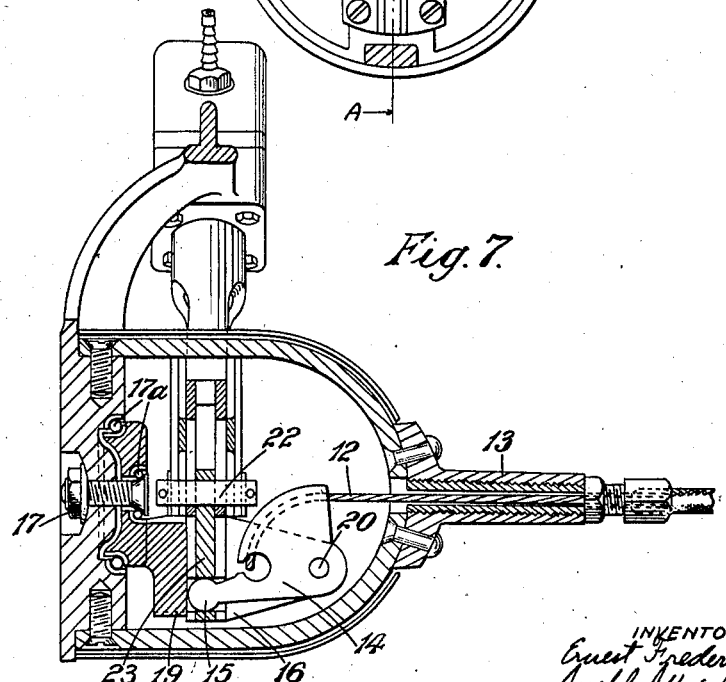
Fig. 7 is a part sectional side elevation of the multi-relay valve shown in Fig. 6 along the line A, A, and in the direction of the arrows.

The remote or valve operating end 12, Fig. 7 of the cable 3 is passed through a tubular guide 13 forming part of the multi-pneumatic relay unit 4 and after passing within the casing of this unit is led tangentially over a guiding surface formed on a segmental member 14 having a part spherical toe portion 15 which is displaceable substantially at right angles to the cable at the point of entry when the cable is pulled, or released.

The segmental member 14 is pivoted at 20 between shoulders 16 one of which is shown in Fig. 7.

These shoulders and in consequence the segment 14 rotatably supported between them are also rotatable in a plane at right angles to the guide 13 about ball bearings 17a positioned about an axis constituted by the nut and bolt 17 and of which the nut and bolt form a part, when assembled.

The rotational displacement of the segmental member 14 at right angles to its own plane and to that of the cable where it enters the multi-valve casing is effected by a hand or foot control 18 preferably the latter as shown in Figs. 1 and 6 which forms a part of the guideway carrier 19 and is rotatable with the shoulders 16 about the axis 17.

The supply of pressure fluid to the brakes is controlled by a plurality of fluid pressure relays 25 the actuation of which is effected by links 21 Fig. 6, which are pivoted together at 22 around which common pivot the links 21 partly revolve during the linear displacement of the common pivot 22 along a guideway 23, the displacement of the common pivot along the guideway being effected by the movement of the ball toe portion 15 of the segmental member 14 which is rocked by the cable when the pilot operates the finger control. The displacement of the pivot along the guideway 23 causes corresponding displacements of the outer ends of the links 29 and actuating sleeves 28 along the converging paths defined by the tubular inner ends of the individual relay valve casings 25.

In operation on compressing the finger lever 1 towards or against the flying control without moving the foot control 18, the relay actuating links 31 are displaced symmetrically and actuate the relays equally but if the pilot displaces the foot control 18, the guideway and links are symmetrically displaced and one relay is actuated more than the other, independently of whether the finger control has been again moved or not.

It will be seen however that if the pedal 18 alone be moved without moving the finger lever 1, then the common pivot 22 of the actuating links does not move along the guideway 23 and the relays remain inoperative, and that a prior movement of the finger control is required before any differential brake pressure can be applied by moving the pedal 18 alone.

The pilot may thus obtain the following braking effects,—he may apply an equalized brake pressure, and may increase or diminish such pressure by equal amounts or he may also vary the pressure so as to obtain a differential pressure which is built up more or less gradually from an equalized pressure according to the speed with which the controls are operated, or he may apply an initial differential brake pressure by operation of the rudder bar or pedals 18 before moving the finger lever, the differential pressure gradually building up or decreasing according to whether the finger lever is compressed or released.

As indicated in Fig. 1 the pedal for controlling differential operation preferably also constitutes the steering control for deflecting a rudder and/or steering wheel.

The multiple relay unit 4 comprises a plurality of pneumatic relays 25 which may be of identical construction as shown.

By the employment of these pneumatic or fluid relays 25, the comparatively small digital exertion called for by fingers of the pilot's hand is transformed into a powerful fluid pressure action of comparatively unlimited power.

While we have shown two such units 25 each of which may operate not only one but several brakes on each side of the aircraft, it will be evident that by a suitable enlargement of the apparatus additional relays may be used in superposed or other relation and operated from an extension of the spindle 22 in similar manner.

Each of these relays 25 is supplied with fluid under pressure from pipes 5 which may be joined together and connected to a container 6 as shown in Fig. 1 holding fluid under pressure and each relay controls the supply of fluid to the brakes through inlet ports 27, the pipes being connected to inlet and outlet ports by high compression joints 26, the design of which will be described later, as it is of importance in conserving loss of the pressure fluid due to leakage.

Each relay valve comprises a tubular body portion 25 secured to the frame or base 4 of the multiple unit, the body portion containing a sleeve 28 which is displaceable within the body 25 by the link 21 to which it is pivotally connected at 29.

An inner sleeve 30 the bore of which serves as an exhaust outlet bears against a shouldered washer on the outer end of the inner sleeve 28 and is surrounded by a coiled compression spring 31, this spring exerting pressure between the shouldered washer on the sleeve 28 and similar shoulders 32 on the enlarged outer end of the sleeve 30.

The enlarged outer end of the sleeve 30 is of conical formation the central portion being threaded and extending through an aperture in a yielding diaphragm 33 which is clamped between the conical head on the sleeve 30 and a conical washer 34, the conical portions of washer and sleeve being adjacent one another, the more readily to permit of deformation of the diaphragm.

The outer end of the sleeve 30 is provided with a neck portion which extends through the washer the part protruding through the washer being of tapered formation at 42 and engaging a displaceable valve 35 centered on a spindle 36 passing part way down the tube in the sleeve 30.

The valve disc 35 seals the exhaust to atmosphere from a chamber 37 from which the air is led, away to the brakes 9 and 10 through ports 27 after being supplied from the pipes 5 connected to the air bottle or container 6.

Admission of air under pressure from the air chamber 6 is governed by a similar valve disc 38 also carried on the spindle 36 which is pressed by a smaller spring 39 against a conical valve seat 40 secured to a sleeve 41 inset into the outer end of the outer portion of the casing.

The operation of each fluid pressure relay takes place as follows:—

On outward displacement of the pivot 22, the link 21 pushes the yielding diaphragm outwardly, the exhaust valve disc 35 being carried outwards at the same time in spring pressed contact with the exhaust port opening to the sleeve 30.

The inlet valve 38 however is displaced from its seat 40 and fluid under pressure enters the chamber 37 from the supply pipe 5 and passes on to energize the brakes.

The pressure flowing to the brakes builds up according to the degree of displacement of the yielding diaphragm until the load upon the outer face of the washer 34 equals the force exerted by the pilot upon the spring 31, and then remains constant until the spring 31 is further compressed or released.

When the pilot releases the brake lever the valve disc 38 prevents further admission of fluid pressure to the brakes by seating against the conical seat 40 thereby cutting of the pressure supply, and the outlet and exhaust valve seat 42 is at the same time displaced inwardly from the valve disc 35 thereby allowing pressure in the chamber 37 to exhaust to atmosphere, thus releasing the brakes.

As conservation of the fluid pressure is of considerable importance the joints 26 between the pipes 5 and the valves consist of concentric sleeves respectively internally and externally threaded, the sleeves having complementary tapered portions 43 and 44 such that when assembled and screwed together the sleeves exert pressure upon a deformable packing 45 which may be of lead, the lead surrounding the end of a tube the bore of which is corrugated and fits over corresponding separations in a pipe extending from the valve.

Suitable individual or combined gauges may be connected to the air containers and to the individual valves to indicate to the pilot the total available pressure and the pressure which is being applied to each brake or group of brakes, at any instant.

What we claim is—

1. Brake control mechanism of the type described comprising a plurality of fluid pressure relays, a common actuating means for said relays, means for moving said actuating member, and independent means to proportion said movement between said relays.

2. Aeroplane brake mechanism comprising a plurality of fluid pressure relays, a movable member for actuating said relays, a guide for said member, and means to direct said guide symmetrically with respect to said relays.

3. Aeroplane brake control mechanism comprising a plurality of fluid pressure relays, a common actuating member, a guide for said actuating member, and independent means to tilt said guide to different angles from a position symmetrical to said relays.

4. Aircraft brake control mechanism which comprises a rotatable guide, an actuating member mounted in said guide and movable from the axis of rotation of said guide, a plurality of pressure control relays, and links connecting said relays to said actuating member, and means for rotating said guide to any desired position between said links.

5. Aeroplane brake control mechanism comprising a plurality of pressure control relays having actuating parts arranged radially to a common center, an actuating member, a guide for said actuating member movable between the converging lines of said relays, and means for rotating said guide toward or from the converging line of a selected relay.

6. Aeroplane brake control mechanism which comprises a pair of control relays actuated by control mechanism movable on lines that diverge from a common point, an actuating mechanism, a guide for said actuating mechanism, and means to rotate said guide to different positions between the intersecting lines of movement of said relay mechanism to proportion the movement of said control mechanism between said relays.

7. Aeroplane brake control mechanism which comprises a pair of control relays actuated by control mechanism movable on lines that diverge from a common point, an actuating mechanism, a guide for said actuating mechanism, means to rotate said guide to different positions between the intersecting lines of movement of said relay mechanism to proportion the movement of said control mechanism between said relays, and means comprising a flexible cord to move said actuating member.

8. Aeroplane brake control mechanism which comprises a pair of control relays actuated by control mechanism movable on lines that diverge from a common point, an actuating mechanism, a guide for said actuating mechanism, means to rotate said guide to different positions between the intersecting lines of movement of said relay mechanism to proportion the movement of said control mechanism between said relays, a rudder bar, and common means for actuating said rudder bar and rotating said guide.

9. Aeroplane brake control mechanism which comprises a plurality of pneumatic control relays each of which comprises an outlet port to the brake mechanism, an inlet port and an exhaust port, valve mechanism movable in a straight line to operate said inlet and exhaust valves alternately, said mechanism comprising a spring controlled member to close the inlet port, the lines of movement of said control mechanisms intersecting, an actuating member, links connecting said actuating member to said control relays, a guide for said actuating member, and means for swinging said guide to different angular positions between the lines of movement of said valve mechanism to proportion the movement of said member between said relays.

10. Brake control mechanism of the type described comprising a plurality of fluid pressure relays, a common actuating means for said relays having a dead center and movable from said dead center to actuate said relays, and independent means movable to proportion the distance of said actuating means from said dead center in selected ratio between said relays.

11. Brake control mechanism for aircraft which comprises a control lever, a plurality of fluid pressure brake control relays, a common actuating means for said relays, means mounted on said lever for moving said actuating means, a rudder control, and means operable by said rudder control to proportion the movement of said actuating means in selected ratio between said pressure relays.

12. Aircraft brake control systems comprising a supply of brake energizing fluid under initial pressure, brake actuating mechanism, means to control the release of fluid pressure to said brake actuating mechanism independently of the flying control and comprising a finger control lever attached to the principal flying control for simultaneous and independent displacement, and having means to cause differential pressures to be distributed to different brake mechanisms, a rudder actuating means, and means actuated by said rudder actuating means to proportion said differential pressure when said brakes are applied, and in which the brakes are differentially applied automatically by moving the finger lever after the rudder is deflected.

13. Aircraft brake control systems comprising a supply of brake energizing fluid under initial pressure, brake actuating mechanism, means to control the release of fluid pressure to said brake actuating mechanism independently of the flying control and comprising a finger control lever attached to the principal flying control for simultaneous and independent displacement, in which the finger lever is connected to a pivot common to a plurality of relay valve actuating members displaceable along converging paths.

14. Aircraft brake control systems comprising a supply of brake energizing fluid under initial pressure, brake actuating mechanism, means to control the release of fluid pressure to said brake actuating mechanism independently of the flying control and comprising a finger control lever attached to the principal flying control for simultaneous and independent displacement, in which the finger lever is connected to a pivot common to a plurality of relay valve actuating members displaceable along converging paths, and in which the pivot is displaceable along a guideway the angular relation of which is variable in relation to the paths traversed by the relay valve actuating members.

15. Aircraft brake control systems comprising a supply of brake energizing fluid under initial pressure, brake actuating mechanism, means to control the release of fluid pressure to said brake actuating mechanism independently of the flying control and comprising a finger control lever attached to the principal flying control for simultaneous and independent displacement, in which the finger lever is connected to a pivot common to a plurality of relay valve actuating members displaceable along converging paths, and in which the pivot is displaceable along a guideway the angular relation of which is variable in relation to the paths traversed by the relay valve actuating members, and in which the guideway is rotatably mounted in relation to the relay valve actuating members.

16. Aircraft brake control systems comprising a supply of brake energizing fluid under initial pressure, brake actuating mechanism, means to control the release of fluid pressure to said brake actuating mechanism independently of the flying control and comprising a finger control lever attached to the principal flying control for simultaneous and independent displacement, in which the finger lever is connected to a pivot common to a plurality of relay valve actuating members displaceable along converging paths, and comprising dual relay valves each connected to a chamber containing fluid under pressure.

17. Aircraft brake control systems comprising a supply of brake energizing fluid under initial pressure, brake actuating mechanism, means to control the release of fluid pressure to said brake actuating mechanism independently of the flying control and comprising a finger control lever attached to the principal flying control for simultaneous and independent displacement, in which the finger lever is connected to a pivot common to a plurality of relay valve actuating members displaceable along converging paths, and comprising dual relay valves each connected to a chamber containing fluid under pressure, and in which each relay valve controls a brake or group of brakes on each side of the centre line of the aeroplane.

In witness whereof we have hereunto signed our names.

ERNEST FREDERICK GOODYEAR.
JOSEPH WRIGHT.
HENRY TREVASKIS.